United States Patent
Sakuma

(10) Patent No.: US 8,107,907 B2
(45) Date of Patent: Jan. 31, 2012

(54) INFORMATION PROCESSING APPARATUS, METHOD, AND PROGRAM

(75) Inventor: Tsuyoshi Sakuma, Tokyo (JP)

(73) Assignee: Sony Corporation, Tokyo (JP)

( * ) Notice: Subject to any disclaimer, the term of this patent is extended or adjusted under 35 U.S.C. 154(b) by 506 days.

(21) Appl. No.: 11/809,933

(22) Filed: Jun. 4, 2007

(65) Prior Publication Data

US 2007/0298746 A1    Dec. 27, 2007

(30) Foreign Application Priority Data

Jun. 19, 2006   (JP) ................ P2006-168968

(51) Int. Cl.
*H04B 17/00*   (2006.01)

(52) U.S. Cl. ............ 455/226.1; 455/136; 455/232.1; 455/234.1; 455/234.2; 455/253.2

(58) Field of Classification Search ............ 455/226.1, 455/136, 232.1–253.2

See application file for complete search history.

(56) References Cited

U.S. PATENT DOCUMENTS

| | | | | |
|---|---|---|---|---|
| 6,226,504 | B1 * | 5/2001 | Takagi | 455/234.1 |
| 6,941,122 | B2 * | 9/2005 | Shim | 455/232.1 |
| 7,072,424 | B2 * | 7/2006 | Forrester | 375/316 |
| 7,545,321 | B2 * | 6/2009 | Kawasaki | 342/368 |
| 2006/0217094 | A1 * | 9/2006 | Ikeda et al. | 455/136 |
| 2009/0213276 | A1 * | 8/2009 | Tsilioukas | 348/731 |

FOREIGN PATENT DOCUMENTS

JP    2004-274713    9/2004

* cited by examiner

*Primary Examiner* — Sanh D Phu

(74) *Attorney, Agent, or Firm* — Robert J. Depke; Rockey, Depke & Lyons, LLC

(57) ABSTRACT

Disclosed herein is an information processing apparatus including: judging means for judging whether a receiving device for receiving a signal amplified by an amplifying circuit which amplifies a supplied signal has a good reception state or not; and control means for changing a power supply voltage of said amplifying circuit to change a gain of the amplifying circuit if said judging means judges that said receiving device does not have a good reception state.

7 Claims, 7 Drawing Sheets

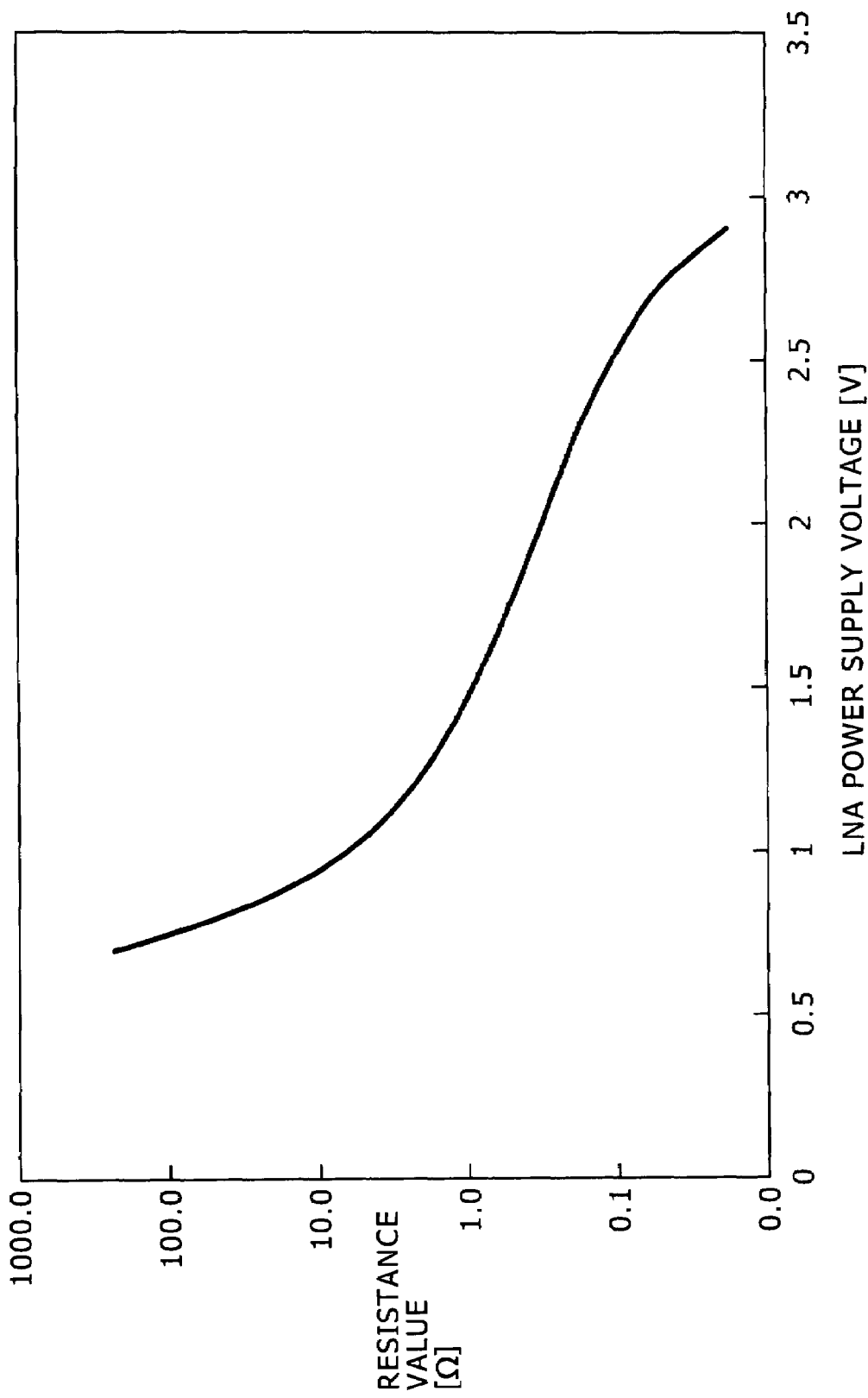
F I G . 5

INFORMATION PROCESSING APPARATUS, METHOD, AND PROGRAM

CROSS REFERENCES TO RELATED APPLICATIONS

The present invention contains subject matter related to Japanese Patent Application JP 2006-168968 filed in the Japan Patent Office on Jun. 19, 2006, the entire contents of which being incorporated herein by reference.

BACKGROUND OF THE INVENTION

1. Field of the Invention

The present invention relates to an information processing apparatus, method, and program, and more particularly to an information processing apparatus, method, and program for enabling a broadcast receiver for receiving broadcast signals to properly receive broadcast signals transmitted with strong radio waves and to have an increased capability for receiving broadcast signals transmitted with weak radio waves.

2. Description of the Related Art

For increasing the reception sensitivity of a broadcast receiver as a capability for receiving weak broadcast signals transmitted with weak radio waves, it is known in the art that it is effective to reduce the NF (Noise Figure) of the broadcast receiver.

According to one approach to reduce the NF of a broadcast receiver, an LNA (Low Noise Amplifier) is connected to the front stage of a tuner incorporated in the broadcast receiver.

There are small-size broadcast receivers such as portable terminals having a function to receive broadcast signals such as television broadcasts known as so-called one-segment broadcasts. Such small-size broadcast receivers are highly limited as to the scale of circuits which can be incorporated therein and the overall receiver size. An LNA with a fixed gain is employed in those small-size broadcast receivers.

FIG. 1 of the accompanying drawings shows a broadcast receiver having an LNA in the related art.

As shown in FIG. 1, the broadcast receiver, generally denoted by 11, includes an input terminal 31, a constant-voltage source 32, an LNA 33, and a tuner 34.

The input terminal 31 is supplied with a broadcast signal (also referred to as RF (Radio Frequency) signal) of a television broadcast from an antenna, not shown. The RF signal supplied to the input terminal 31 is supplied to the LNA 33.

The constant-voltage source 32 includes a battery, for example, and has a negative terminal connected to ground and a positive terminal to a power supply terminal 35 of the LNA 33. The constant-voltage source 32 outputs a constant voltage E that is applied as a power supply voltage to the power supply terminal 35 of the LNA 33.

The LNA 33 includes an amplifying circuit having a single transistor, for example. The LNA 33 amplifies the RF signal (broadcast signal) supplied from the input terminal 31 and supplies the amplified RF signal to the tuner 34.

The tuner 34 processes the RF signal supplied from the LNA 33 into a transport stream, and outputs the transport stream.

Specifically, the tuner 34 includes an RF processor 51 and a demodulator 52.

The RF processor 51 converts the RF signal supplied from the LNA 33 into an IF (Intermediate Frequency) signal, and supplies the IF signal to the demodulator 52.

The demodulator 52 demodulates the IF signal supplied from the RF processor 51 into a transport stream, and outputs the transport stream.

Since the LNA 33 is connected to the front stage of the tuber 34, the broadcast receiver 11 has a low NF. Therefore, the broadcast receiver 11 has a higher reception sensitivity for broadcast signals transmitted with weak radio waves than broadcast receivers that are free of an LNA.

There has been proposed an LNA having a path for amplifying an input signal and a path for bypassing an input signal, so that an input signal can selectively be amplified and bypassed. See, for example, Japanese Patent Laid-Open No. 2004-274713 (hereinafter referred to as Patent Document 1)

SUMMARY OF THE INVENTION

In the broadcast receiver 11 with the fixed-gain LNA 33, it is difficult to achieve a high distortion resistance, i.e., to increase the resistance to signal distortions, while keeping the NF low.

Specifically, in order to reduce the NF of the broadcast receiver 11, it is necessary to increase the gain of the LNA 33, for example. When a strong signal is supplied to the LNA 33, the tuner 34 in the rear stage of the LNA 33 tends to cause a signal distortion, resulting in an error and a reception failure.

If the gain of the LNA 33 is lowered, then the NF of the broadcast receiver 11 is increased and the reception sensitivity is reduced.

The LNA disclosed in Patent Document 1 may be employed to selectively amplify a weak signal and bypass a strong signal. Therefore, the reception sensitivity for weak signals can be increased, and the high distortion resistance for strong signals can be achieved.

There is a demand for another approach for realizing both an increased reception sensitivity and a high distortion resistance.

It is desirable to provide an information processing apparatus, method, and program which are capable of realizing both an increased reception sensitivity and a high distortion resistance.

According to an embodiment of the present invention, an information processing apparatus includes judging means for judging whether a receiving device for receiving a signal amplified by an amplifying circuit which amplifies a supplied signal has a good reception state or not, and control means for changing a power supply voltage of the amplifying circuit to change a gain of the amplifying circuit if the judging means judges that the receiving device does not have a good reception state.

The information processing apparatus may further include a plurality of resistors having different resistance values, respectively, and selecting means for selecting one of the resistors, wherein the amplifying circuit is supplied with a voltage from a constant-voltage source through the resistor selected by the selecting means, as the power supply voltage, and the control means controls the selecting means to change the power supply voltage applied to the amplifying circuit.

The information processing apparatus may further include one or both of the amplifying circuit and the receiving device.

According to another embodiment of the present invention, an information processing method or a program for controlling a computer to perform an information processing process includes the steps of judging whether a receiving device for receiving a signal amplified by an amplifying circuit which amplifies a supplied signal has a good reception state or not, and changing a power supply voltage of the amplifying circuit to change a gain of the amplifying circuit if it is judged that the receiving device does not have a good reception state.

According to an embodiment of the present invention, it is judged whether the receiving device for receiving a signal amplified by the amplifying circuit which amplifies a supplied signal has a good reception state or not. If it is judged that the receiving device does not have a good reception state, then the power supply voltage of the amplifying circuit is changed to change the gain of the amplifying circuit.

According to an embodiment of the present invention, both an increased reception sensitivity and a high distortion resistance are realized.

BRIEF DESCRIPTION OF THE DRAWINGS

FIG. 5 is a graph showing the relationship between the power supply voltage of the LNA and the resistance value of a resistor for applying the power supply voltage to a power supply terminal;

DETAILED DESCRIPTION OF THE PREFERRED EMBODIMENT

An embodiment of the present invention will be described below. Components called for in claims and specific components described in the embodiments below are related to each other as described below. The description of the relation between those claimed components and specific components serves to confirm that the specific components that support the invention described in the claims are described in the embodiments. Just because there are specific components described in the embodiment, but not described to refer to claimed components does not necessarily mean that those specific components do not correspond to claimed components. Conversely, just because there are specific components described to refer to claimed components does not necessarily mean that those specific components do not correspond to other components than claimed components.

Figure 2:
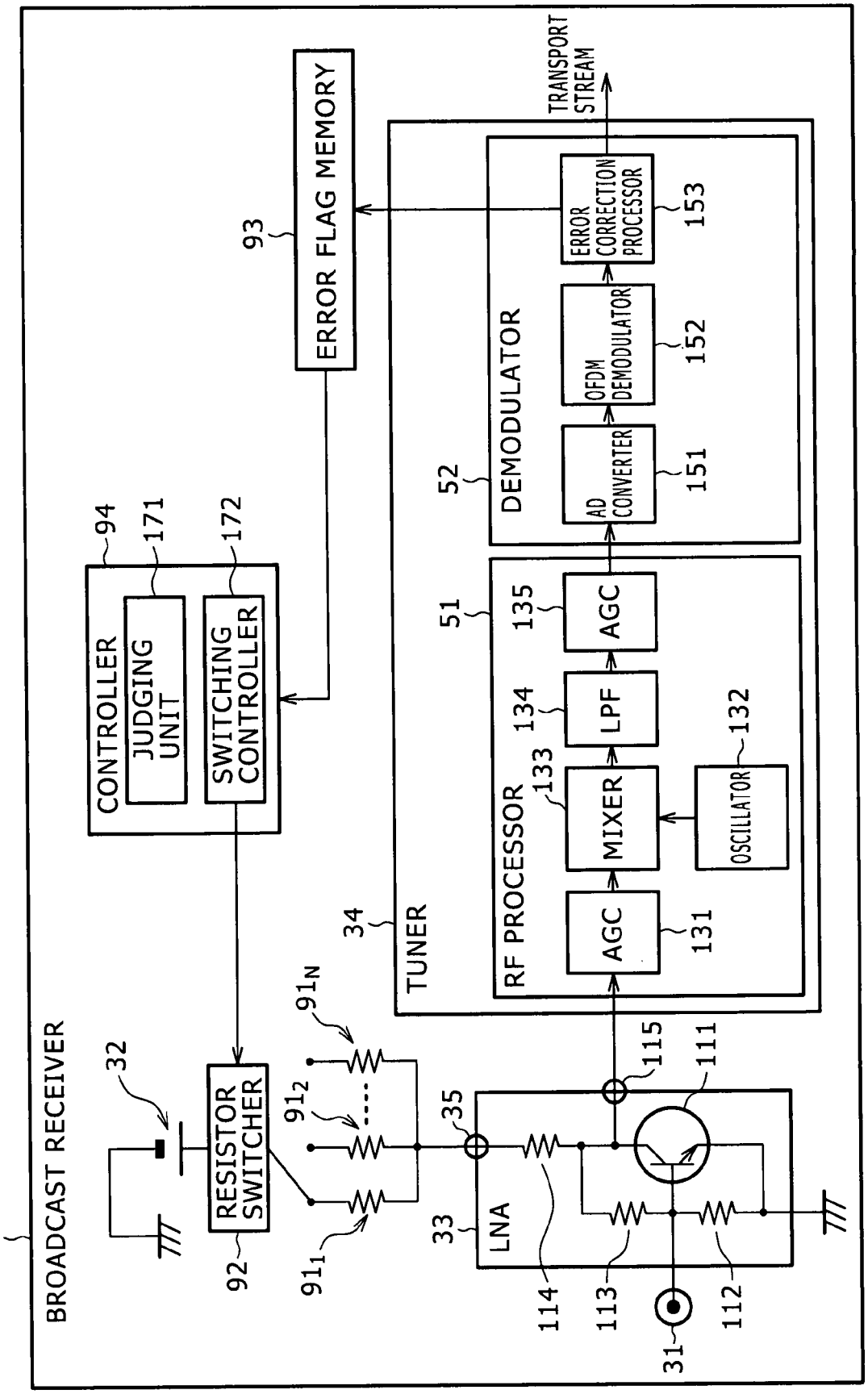
FIG. 2 is a block diagram of a broadcast receiver to which the present invention is applied.

According to an embodiment of the present invention, an information processing apparatus, e.g., a broadcast receiver 71 shown in FIG. 2, includes judging means, e.g., a judging unit 171 shown in FIG. 2, for judging whether a receiving device, e.g., a tuner 34 shown in FIG. 2, for receiving a signal amplified by an amplifying circuit, e.g., a LNA 33 shown in FIG. 2, which amplifies a supplied signal has a good reception state or not, and control means, e.g., a switching controller 172 shown in FIG. 2, for changing a power supply voltage of the amplifying circuit to change a gain of the amplifying circuit if the judging means judges that the receiving device does not have a good reception state.

The information processing apparatus may further include a plurality of resistors, e.g., resistors $91_1$ through $91_N$ shown in FIG. 2, having different resistance values, respectively; and selecting means, e.g., a resistor switcher 92 shown in FIG. 2, for selecting one of the resistors; wherein the amplifying circuit is supplied with a voltage from a constant-voltage source through the resistor selected by the selecting means, as the power supply voltage, and the control means controls the selecting means to change the power supply voltage applied to the amplifying circuit.

Figure 6:
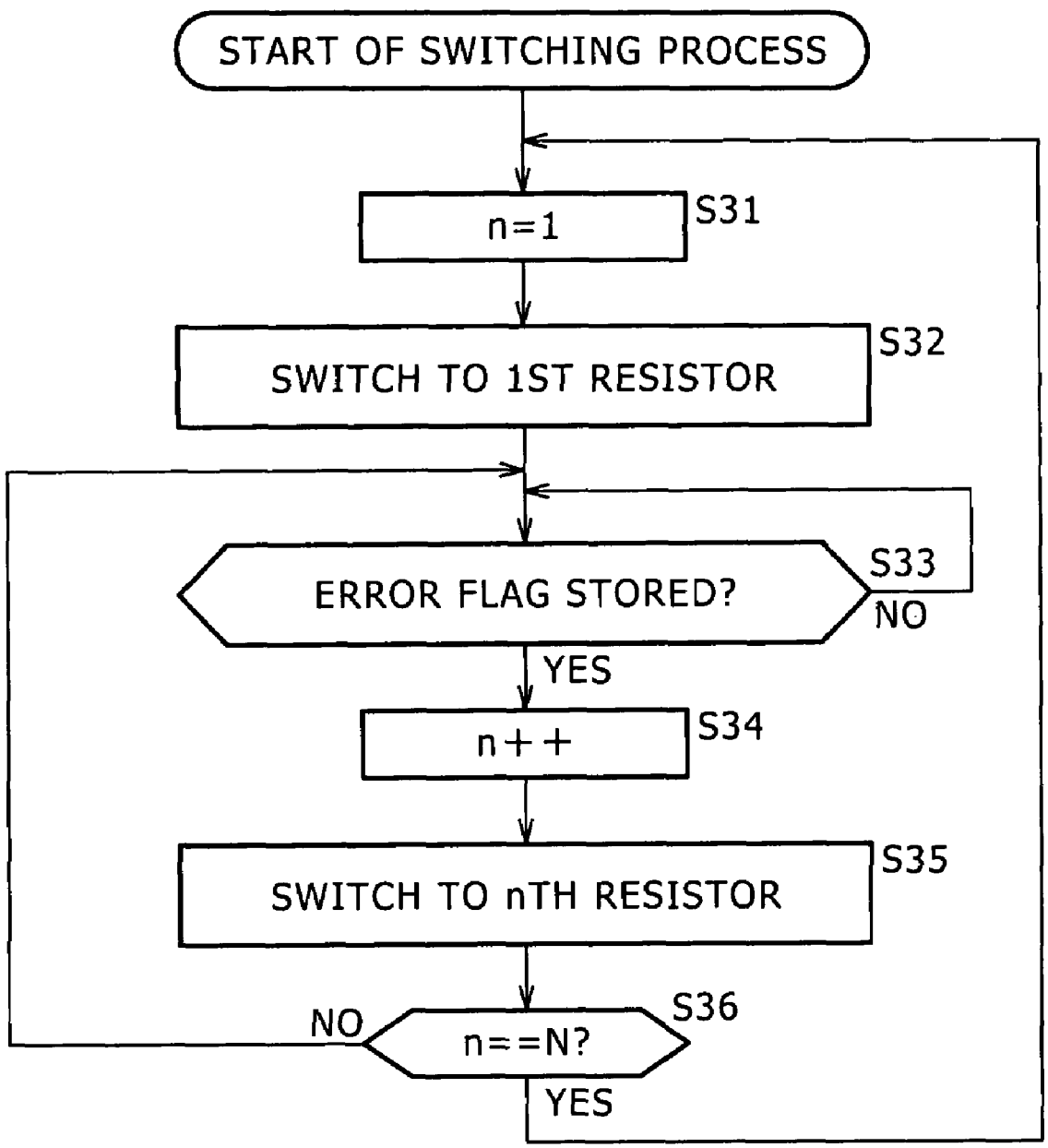
FIG. 6 is a flowchart of a switching sequence of a controller.

According to another embodiment of the present invention, an information processing method or a program for controlling a computer to perform an information processing process includes the steps of: judging whether a receiving device for receiving a signal amplified by an amplifying circuit which amplifies a supplied signal has a good reception state or not, e.g., step S33 shown in FIG. 6; and changing a power supply voltage of the amplifying circuit to change a gain of the amplifying circuit if it is judged that the receiving device does not have a good reception state, e.g., step S35 shown in FIG. 6.

The embodiment of the present invention will be described in detail below with reference to the drawings.

FIG. 2 shows in block form a broadcast receiver to which the present invention is applied.

Figure 1:
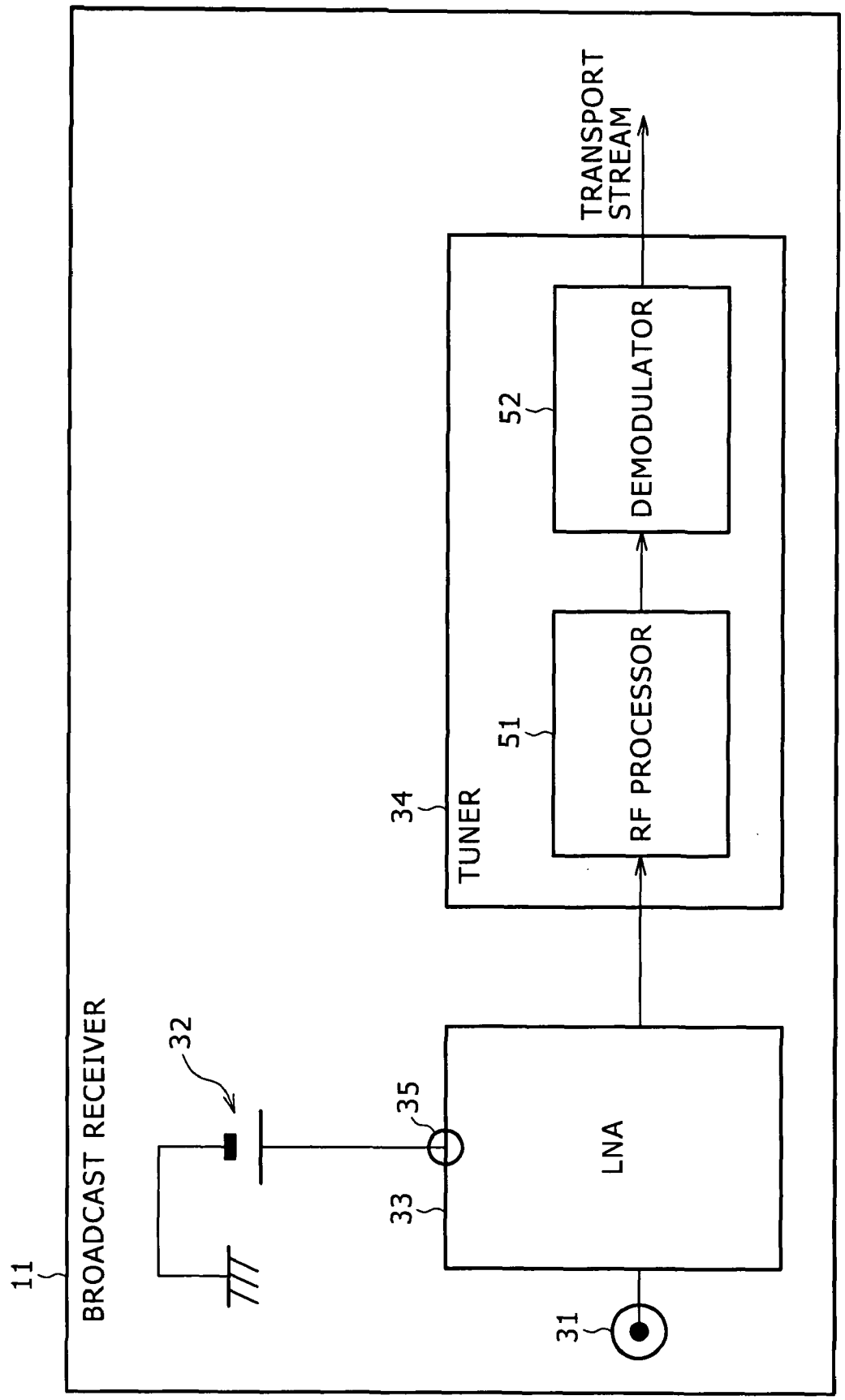
FIG. 1 is a block diagram of a broadcast receiver having an LNA in the related art.

Those parts shown in FIG. 2 which are identical to those shown in FIG. 1 are denoted by identical reference characters and will not be described in detail below.

As shown in FIG. 2, a broadcast receiver 71 according to an embodiment of the present invention includes an input terminal 31, a constant-voltage source 32, an LNA 33, a plurality of tuner 34, resistors $91_1$ through $91_N$, a resistor switcher 92, an error flag memory 93, and a controller 94.

The input terminal 31 is supplied with a broadcast signal (RF signal) of a digital television broadcast. The RF signal supplied to the input terminal 31 is supplied to the LNA 33.

The constant-voltage source 32 has a negative terminal connected to ground and a positive terminal to the resistor switcher 92.

The LNA 33 amplifies the RF signal supplied from the input terminal 31 and supplies the amplified RF signal to the tune 34.

Specifically, the LNA 33 includes a transistor 111 and a plurality of resistors 112 through 114.

In FIG. 2, the LNA 33 is shows as being an equivalent circuits. The above elements that make up the circuit of the LNA 33 may be replaced with other equivalent elements or circuits.

The transistor 111 includes an NPN (Negative Positive Negative) bipolar transistor, for example.

The transistor 111 has a collector terminal connected through the resistor 114 to the power supply terminal 35 of the LNA 33. The collector terminal of the transistor 111 is connected through the resistor 113 to the base terminal of the transistor 111, so that a signal from the collector terminal is applied through a negative feedback loop to the base terminal. The collector terminal of the transistor 111 is also connected to an output terminal 115 of the LNA 33.

The base terminal of the transistor 111 is connected through the resistor 112 to ground (hereinafter also referred to as GND (ground)). The resistor 112 and the resistor 113 determine an input potential (hereinafter referred to as bias) of the transistor 111.

The transistor 111 has an emitter terminal connected to GND.

In the LNA 33, the RF signal supplied from the input terminal 31 is amplified by the transistor 111, and the amplified signal is output from the output terminal 115. The amplified signal output from the output terminal 115 is supplied to the tuner 34.

The tuner 34 processes the RF signal supplied from the LNA 33 into a transport stream, and outputs the transport stream.

Specifically, the tuner 34 includes an RF processor 51 and a demodulator 52.

The RF processor 51 converts the RF signal supplied from the LNA 33 into an IF signal, and supplies the IF signal to the demodulator 52.

The RF processor 51 includes an AGC (Automatic Gain Control) unit 131, an oscillator 132, a mixer 133, an LPF (Low Pass Filter) 134, and an AGC unit 135.

The AGC unit 131 amplifies the amplified RF signal supplied from the LNA 33, and supplies the amplified RF signal to the mixer 133.

In order to extract a signal of a given channel (frequency band) from the RF signal, the oscillator 132 generates a signal having a predetermined frequency depending on the channel, and supplies the generated signal to the mixer 133.

The mixer 133 multiplies (mixes) the RF signal supplied from the AGC unit 131 and the signal having the predetermined frequency supplied from the oscillator 132, thereby converting the RF signal into an IF signal, and supplies the IF signal to the LPF 134.

The LPF 134 removes unwanted high-frequency components from the IF signal supplied from the mixer 133 to produce a signal of a given channel, and supplies the produced signal to the AGC unit 135.

The AGC unit 135 amplifies the IF signal supplied from the LPF 134 into a signal having a suitable amplitude, and supplies the signal to the demodulator 52.

The demodulator 52 demodulates the IF signal supplied from the RF processor 51 into a transport stream, and outputs the transport stream.

Specifically, the demodulator 52 includes an AD (Analog to Digital) converter 151, an OFDM (Orthogonal Frequency Division Multiplexing) demodulator 152, and an error correction processor 153.

The AD converter 151 converts the IF signal supplied from the RF processor 51 into a digital IF signal, and supplies the digital IF signal to the OFDM demodulator 152.

The OFDM demodulator 152 OFDM-demodulates the digital IF signal supplied from the AD converter 151 into data, and supplies the data to the error correction processor 153.

The error correction processor 153 performs an error correction process on the data supplied from the OFDM demodulator 152 to generate a transport stream, and outputs the transport stream. If the error correction processor 153 detects an error according to error correction process, then the error correction processor 153 supplies an error signal indicative of the detection of the error to the error flag memory 93.

The resistors $91_1$ through $91_N$ have different resistance values, respectively. The resistors $91_1$ through $91_N$ have respective ends connected to the power supply terminal 35. The other respective ends of the resistors $91_1$ through $91_N$ are selectively connected to the positive terminal of the constant-voltage source 32 only when they are selected by the resistor switcher 92. Therefore, the constant voltage E from the constant-voltage source 32 is applied as a power supply voltage to the power supply terminal 35 of the LNA 33 through the resistor switcher 92 and a register $91_i$ which is either one of the resistors $91_1$ through $91_N$.

The resistor switcher 92 selects one of the resistors $91_1$ through $91_N$ based on a control signal supplied from the controller 94, and switches between the resistors $91_1$ through $91_N$ to connect the selected resistor to the positive terminal of the constant-voltage source 32.

Therefore, the constant voltage E from the constant-voltage source 32 is applied to the power supply terminal 35 of the LNA 33 through the resistor switcher 92 and a resistor $91_i$ which is either one of the resistors $91_1$ through $91_N$.

If it is assumed that the voltage drop across the resistor switcher 92 is ignored, then a voltage E-$V_i$ which is produced by subtracting a voltage $V_i$ due to the voltage drop across the resistor $91_i$ selected by the resistor switcher 92 from the constant voltage E of the constant-voltage source 32 is applied to the power supply terminal 35 of the LNA 33.

As a result, when the resistor switcher 92 selects a resistor $91t$ ($1 \leq t \leq N$) as one of the resistors $91_1$ through $91_N$ thereby to switch from a resistor $91_s$ ($s \neq t$) based on the control signal from the controller 94, since the resistance value of the resistor $91_t$ is different from the resistance value of the resistor $91_s$, the voltage applied as the power supply voltage to the LNA 33 changes.

The voltage $V_t$ due to the voltage drop across the resistor $91_t$ is different from a voltage $V_s$ due to the voltage drop across the resistor $91_s$. Consequently, when the resistor switcher 92 switches from the resistor $91_s$ to the resistor $91_t$, the voltage applied as the power supply voltage to the LNA 33 changes from E-$V_s$ to E-$V_t$.

The error flag memory 93 stores an error signal supplied from the error correction processor 153 of the tuner 34 as an error flag.

The controller 94 refers to the error flag memory 93. If an error flag is stored in the error flag memory 93, i.e., if the data output from the OFDM demodulator 152 contains an error and hence the tuner 34 does not have a good reception state, then the controller 94 controls the resistor switcher 92 to change the resistor $91_i$.

Specifically, the controller 94 includes a judging unit 171 and a switching controller 172.

The judging unit 171 judges whether the tuner 34 has a good reception state or not. Specifically, if an error flag is stored in the error flag memory 93, then the judging unit 171 judges that the tuner 34 does not have a good reception state. If no error flag is stored in the error flag memory 93, then the judging unit 171 judges that the tuner 34 has a good reception state.

If the judging unit 171 judges that the tuner 34 does not have a good reception state, then the switching controller 172 supplies the resistor switcher 92 with a control signal to change the resistor $91_i$.

With the broadcast receiver 71 thus constructed, if the tuner 34 does not have a good reception state, then the switching controller 172 changes the voltage (power supply voltage) applied to the LNA 33 in order to change the gain of the LNA 33.

Figure 3:
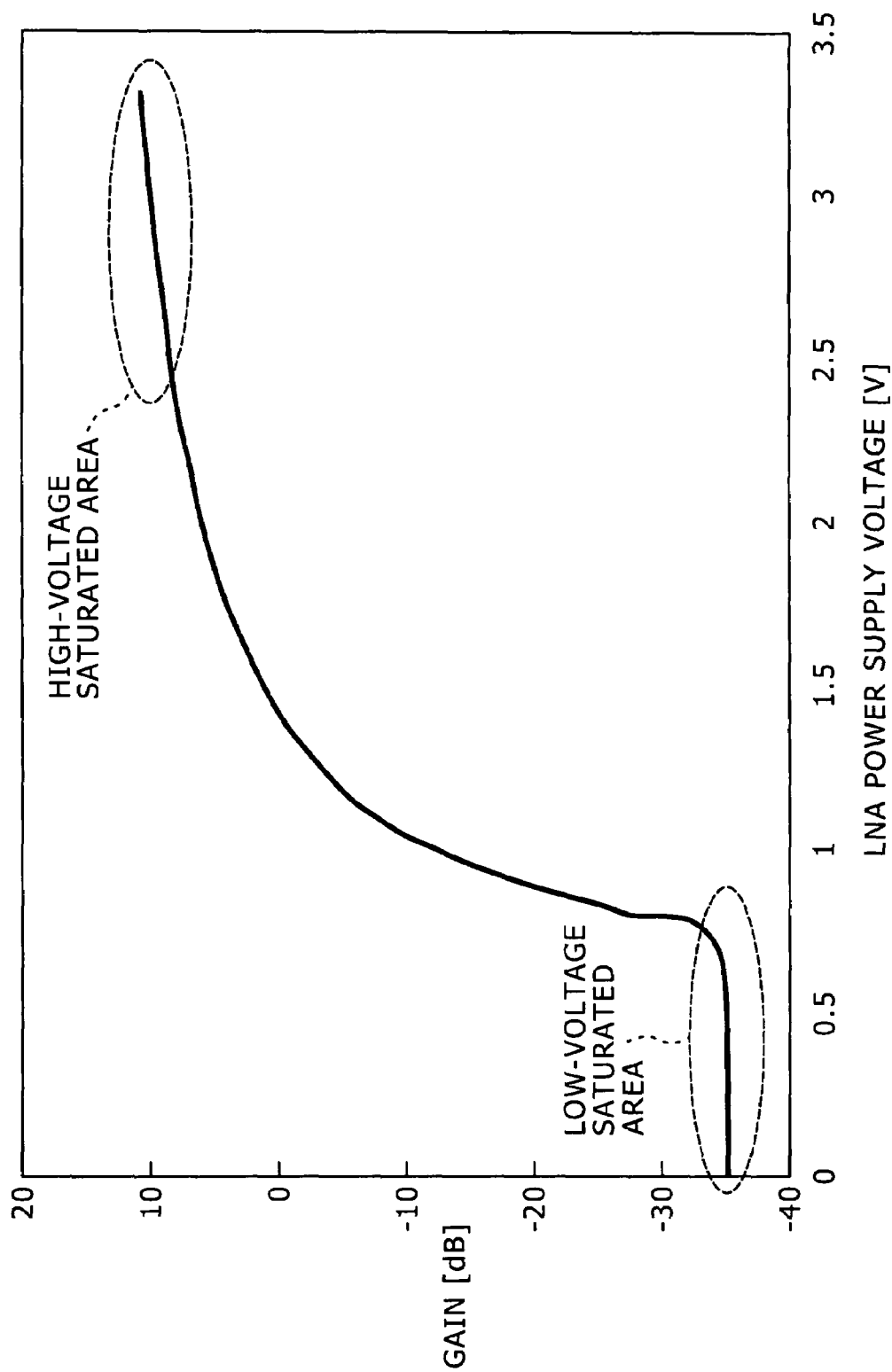
FIG. 3 is a graph showing the relationship between the power supply voltage of an LNA and the gain of the LNA.

FIG. 3 is a graph showing the relationship between the power supply voltage of the LNA 33 and the gain of the LNA 33.

In FIG. 3, the horizontal axis represents the power supply voltage of the LNA 33 indicated in the unit V (Volt) and the vertical axis represents the gain of the LNA 33 indicated in the unit dB (Decibel).

As shown in FIG. 3, the gain of the LNA 33 increases monotonously against the power supply voltage except in a low-voltage saturated area in which the power supply voltage is low and a high-voltage saturated area in which the power supply voltage is high.

It can be seen from FIG. 3 that the gain of the LNA 33 is reduced when the power supply voltage of the LNA 33 is reduced, and the gain of the LNA 33 is increased when the power supply voltage of the LNA 33 is increased.

Figure 4:
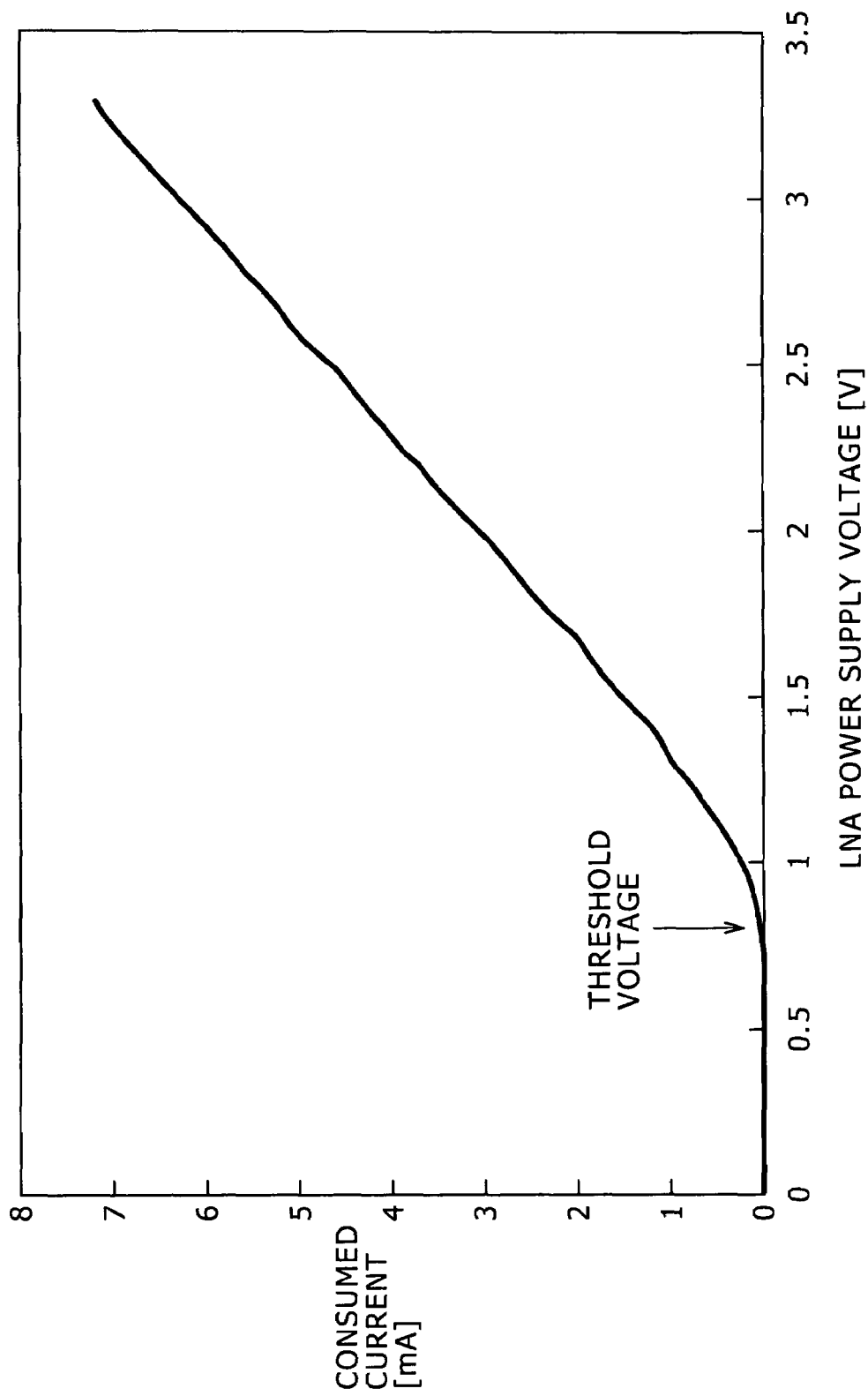
FIG. 4 is a graph showing the relationship between the power supply voltage of the LNA and a current consumed by the LNA.

FIG. 4 is a graph showing the relationship between the power supply voltage of the LNA 33 and a current consumed by the LNA 33.

In FIG. 4, the horizontal axis represents the power supply voltage of the LNA 33 indicated in the unit V (Volt) and the vertical axis represents the current consumed by the LNA 33 indicated in the unit mA (milliampere).

As shown in FIG. 4, the consumed current increases monotonously against the power supply voltage after the power supply voltage exceeds a threshold voltage.

It can be seen from FIG. 4 that when the power supply voltage of the LNA 33 is lower, the consumed current is smaller, and when the power supply voltage of the LNA 33 is higher, the consumed current is greater.

FIG. 5 is a graph showing the relationship between the power supply voltage of the LNA 33, i.e., the voltage applied to the power supply terminal 35 of the LNA 33, and the resistance value of the resistor $91_i$ for applying the power supply voltage to the power supply terminal 35.

In FIG. 5, the horizontal axis represents the power supply voltage of the LNA 33 indicated in the unit V (Volt) and the vertical axis represents the resistance value of the resistor $91_i$ indicated in the unit $\Omega$ (ohm).

In FIG. 5, the constant voltage E of the constant-voltage source 32 is 3 V.

As shown in FIG. 5, the resistance value of the resistor $91_i$ decreases monotonously against the power supply voltage.

It can be seen from FIG. 5 that when the resistance value of the resistor $91_i$ is increased, the power supply voltage of the LNA 33 is lowered, and when the resistance value of the resistor $91_i$ is reduced, the power supply voltage of the LNA 33 is increased.

A review of FIGS. 3 through 5 shows that when the resistance value of the resistor $91_i$ is increased, the power supply voltage of the LNA 33 is lowered (see FIG. 5) and the gain of the LNA 33 is reduced (see FIG. 3). Therefore, even if a high-level RF signal (strong signal) is supplied from the input terminal 31 of the broadcast receiver 71 to the LNA 33, the tuner 34 in the rear stage of the LNA 33 prevents the signal from being distorted and hence prevents a signal reception failure, i.e., realizes a high distortion resistance.

On the other hand, when the resistance value of the resistor $91_i$ is reduced, the power supply voltage of the LNA 33 is increased (see FIG. 5) and the gain of the LNA 33 is increased (see FIG. 3), resulting in a reduction in the NF of the broadcast receiver 71. Therefore, even if a low-level RF signal (weak signal) is supplied from the input terminal 31 of the broadcast receiver 71 to the LNA 33, the reception sensitivity of the broadcast receiver 71 for the RF signal is high.

A switching sequence of the controller 94 will be described below with reference to a flowchart shown in FIG. 6.

The switching sequence is started when the power supply of the broadcast receiver 71 is turned on, for example.

It is assumed that the resistance values of the resistors $91_1$ through $91_N$ are successively higher in the ascending order of the suffixes 1 through N.

In step S31 shown in FIG. 6, the switching controller 172 shown in FIG. 2 sets a variable n representative of the suffixes of the resistors $91_1$ through $91_N$, to an initial value of 1. Then, control goes to step S32.

In step S32, the switching controller 172 switches to the resistor $91_1$ as one of the resistors $91_1$ through $91_N$. Then, control goes to step S33. Specifically, in step S32, the switching controller 172 supplies a control signal for switching to the resistor $91_1$ to the resistor switcher 92. In response to the control signal, the resistor switcher 92 switches to the resistor $91_1$.

In step S33, the judging unit 171 shown in FIG. 2 judges whether an error flag is stored in the error flag memory 93 or not, i.e., whether the tuner 34 has a good reception state or not. If it is judged in step S33 that no error flag is stored in the error flag memory 93, i.e., if the tuner 34 has a good reception state, then control goes back to step S33 to repeat step S33.

If it is judged in step S33 that an error flag is stored in the error flag memory 93, i.e., if the tuner 34 does not have a good reception state, and hence an error in the data from the OFDM demodulator 152 is detected, whereupon an error signal is supplied to the error flag memory 93, and an error flag is stored in the error flag memory 93, then control goes to step S34. In step S34, the switching controller 172 increments the variable n by 1, clears the data stored in the error flag memory 93, i.e., erases the error flag, after which control goes to step S35.

In step S35, the switching controller 172 switches to a resistor $91_n$ (hereinafter referred to as nth resistor). Then, control goes to step S36. Specifically, in step S35, the switching controller 172 supplies the resistor switcher 92 with a control signal for switching from a resistor $91_{n-1}$ to the resistor $91_n$. In response to the control signal, the resistor switcher 92 switches from the resistor $91_{n-1}$ to the resistor $91_n$.

Since the resistance value of the resistor $91_n$ is higher than the resistance value of the resistor $91_{n-1}$, when the resistor $91_{n-1}$ switches to the resistor $91_n$, the power supply voltage of the LNA 33 is lowered as shown in FIG. 5, and the gain of the LNA 33 is reduced as shown in FIG. 3. As a result, the level of the RF signal supplied from the LNA 33 to the tuner 34 is lowered. If the error corresponding to the error flag that is judged as being stored in the error flag memory 93 in step S33 is caused by a signal distortion that has occurred when a high-level RF signal is supplied from the LNA 33 to the tuner 34, then when the resistor $91_{n-1}$ switches to the resistor $91_n$ the level of the RF signal supplied from the LNA 33 to the tuner 34 is lowered, so that the tuner 34 is prevented from causing a signal distortion and an error is prevented from occurring due to a signal distortion.

In step S36, the switching controller 172 judges whether the variable n is equal to the total number N of the resistors $91_1$ through $91_N$ or not.

If it is judged that the variable n is equal to N, then control goes back to step S31 to repeat the process from step S31, i.e., to switch from the resistor $91_N$ to the resistor $91_1$.

Since the resistance value of the resistor $91_1$ is lower than the resistance value of the resistor $91_N$, i.e., the resistance value of the resistor $91_1$ is the lowest among the resistance values of the resistors 912 through $91_N$, when the resistor $91_N$ switches to the resistor $91_1$, the power supply voltage of the LNA 33 becomes the highest as shown in FIG. 5, and the gain of the LNA 33 becomes the highest as shown in FIG. 3. As a result, the NF of the broadcast receiver 71 becomes the lowest. If the error corresponding to the error flag that is judged as being stored in the error flag memory 93 in step S33 is caused by a reduction in the reception sensitivity of the broadcast receiver 71, then when the resistor $91_N$ switches to the resistor $91_1$, the NF of the broadcast receiver 71 becomes the lowest, so that the reception sensitivity of the broadcast receiver 71 increases and an error is prevented from occurring due to a reduction in the reception sensitivity.

If it is judged in step S36 that the variable n is not equal to N, then control goes back to step S33 to repeat the process from step S33.

As described above, when the tuner 34 does not have a good reception state, the broadcast receiver 71 changes the resistor $91_1$ to change the power supply voltage of the LNA 33, thereby changing the gain of the LNA 33. As a result, if a weak signal is supplied to the LNA 33, then the gain of the LNA 33 is increased to increase the reception sensitivity of the broadcast receiver 71. Conversely, if a strong signal is supplied to the LNA 33, then the gain of the LNA 33 is reduced to prevent the tuner 34 from causing a signal distortion and hence to prevent the broadcast receiver 71 from suffering a signal reception failure, i.e., to allow the broadcast receiver 71 to realize a high distortion resistance.

As shown in FIG. 4, when the power supply voltage of the LNA 33 is lowered, the current consumption of the LNA 33 is reduced. Therefore, in the broadcast receiver 71 which changes the power supply voltage of the LNA 33, the average current consumption of the LNA 33 is smaller than in the broadcast receiver 11 (see FIG. 1) which does not change the power supply voltage of the LNA 33. As a result, the average current consumption of the LNA 33 can be reduced.

In the above embodiment, the resistance values of the resistors $91_1$ through $91_N$ are successively higher in the ascending order of the suffixes 1 through N. However, the resistance values of the resistors $91_1$ through $91_N$ may be successively higher in any desired order.

The broadcast receiver 71 described above has the resistors $91_1$ through $91_N$ of different resistance values, and selects one of the resistors $91_1$ through $91_N$ to change the power supply voltage of the LNA 33. However, the power supply voltage of the LNA 33 may be changed by providing a plurality of constant-voltage sources for supplying different constant voltages and selecting one of the constant-voltage sources to supply its constant voltage as the power supply voltage to the LNA 33.

The broadcast receiver 71 described above has the resistor switcher 92 which switches between the resistors $91_1$ through $91_N$ of different resistance values to change the resistance value. However, the resistance value may be changed by providing a variable resistor and changing the resistance value of the variable resistor.

The above switching sequence can be implemented by either hardware or software. If the switching sequence is implemented by software, the program for the software is installed from a program recording medium into a computer incorporated in dedicated hardware or a general-purpose computer which is capable of performing various functions with various programs installed therein.

Figure 7:
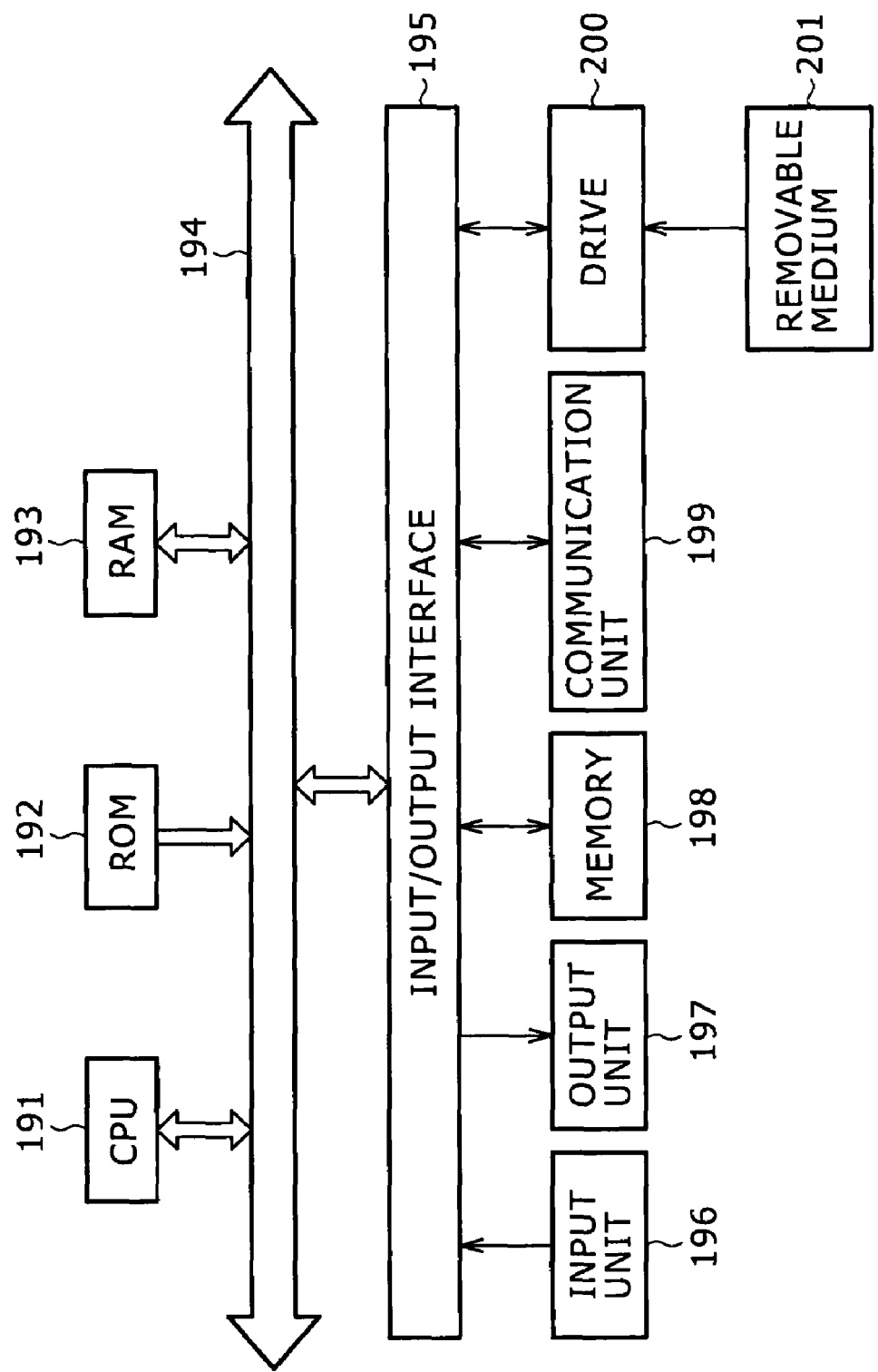
FIG. 7 is a block diagram of a personal computer which is programmed to perform the switching sequence.

FIG. 7 is a block diagram of a personal computer which is programmed to perform the above sequence. A CPU (Central Processing Unit) 191 executes various processes according to a program stored in a ROM (Read Only Memory) 192 or a memory 198. A RAM (Random Access Memory) 193 stores programs to be executed by the CPU 191 and data. The CPU 191, the ROM 192, and the RAM 193 are connected to each other by a bus 194.

An input/output interface 195 is connected to the CPU 191 through a bus 194. To the input/output interface 195, there are connected an input unit 196 including a keyboard, mouse, a microphone, etc. and an output unit 197 including a display and a speaker. The CPU 191 executes various processes according to commands entered from the input unit 196, and outputs processed results to the output unit 197.

The memory 198 that is connected to the input/output interface 195 includes a hard disk, for example, and stores programs to be executed by the CPU 191 and various data. A communication unit 199 communicates with an external device through a network such as the Internet or a local area network.

A program may be acquired through the communication unit 199 and stored in the memory 198.

When a removable medium 201 such as a magnetic disk, an optical disk, a magneto-optical disk, or a semiconductor memory is inserted into a drive 200 that is connected to the input/output interface 195, the drive 200 drives the removable medium 201 and acquires programs and data recorded therein. If necessary, the acquired programs and data are transferred to the memory 198 and stored therein.

As shown in FIG. 7, the program recording medium which stores programs installed in the computer and executable by the computer includes the removable medium 201 as a package medium such as a magnetic disk (including a flexible disk), an optical disk (including a CD-ROM (Compact Disc-Read Only Memory) and a DVD (Digital Versatile Disc)), a magneto-optical disk, or a semiconductor memory, the ROM 192 which temporarily and permanently stores programs, or a hard disk as the memory 198. Programs may be stored into the program storage medium from a wired or wireless communication medium such as a local area network, the Internet, or a digital satellite broadcasting system through the communication unit 199 as an interface such as a router and a modem.

In the present specification, steps of describing a program to be stored in the program recording medium include processes to be chronologically carried out in the order that is described and processes to be carried out parallel to each other or individually rather than chronologically.

The present invention is applicable to a wireless receiver for receiving signals transmitted with radio waves such as a receiver for receiving radio broadcasts, a receiver for receiving wireless LAN signals, in addition to a tuner of a receiver for receiving television broadcast signals.

Although a certain preferred embodiment of the present invention has been shown and described in detail, it should be understood that various changes and modifications may be made therein without departing from the scope of the appended claims.

What is claimed is:

1. An information processing apparatus comprising:
   judging means for judging whether a receiving device for receiving a signal amplified by an amplifying circuit which amplifies a supplied signal has a good reception state or not; and
   control means for changing a power supply voltage of said amplifying circuit to change a gain of the amplifying circuit, and further wherein the judging means makes it determination based on an error rate for a digital signal that is generated from the received signal, and wherein the power supply voltage is altered by the control means so that the amplifying circuit gain is adjusted both up an down incrementally across a range of values in order to prevent a saturation condition for the amplifying circuit.

2. The information processing apparatus according to claim 1, further comprising:
   a plurality of resistors having different resistance values, respectively; and
   wherein the control means provides a signal that causes selection of one of said resistors;
   wherein said amplifying circuit is supplied with a voltage from a constant-voltage source through the resistor selected by said selecting means, as said power supply voltage.

3. The information processing apparatus according to claim 1, further comprising:
   one or both of said amplifying circuit and said receiving device.

4. The information processing apparatus according to claim 1, wherein said receiving device performs an error detecting process to detect an error in data produced by performing a predetermined process on the signal amplified by said amplifying circuit, and if said receiving device detects an error, said judging means judges that said receiving device does not have a good reception state.

5. An information processing method comprising the steps of:

judging whether a receiving device for receiving a signal amplified by an amplifying circuit which amplifies a supplied signal has a good reception state or not; and changing a power supply voltage of said amplifying circuit to change a gain of the amplifying circuit if it is judged that said receiving device does not have a good reception state, and further wherein the judging makes it determination based on an error rate for a digital signal that is generated from the received signal and further wherein the power supply voltage is altered both up an down incrementally so that the amplifying circuit gain is adjusted across a range of values depending on the reception state in order to prevent a saturation condition for the amplifying circuit.

6. A program for performing information processing, the program being stored in a machine readable electronic memory and when executed by a processor controlled system performing the steps of:

judging whether a receiving device for receiving a signal amplified by an amplifying circuit which amplifies a supplied signal has a good reception state or not; and changing a power supply voltage of said amplifying circuit to change a gain of the amplifying circuit if it is judged that said receiving device does not have a good reception state; and further wherein the judging means makes it determination based on an error rate for a digital signal that is generated from the received signal wherein the power supply voltage is altered both up an down incrementally so that the amplifying circuit gain is adjusted across a range of values in order to prevent a saturation condition for the amplifying circuit.

7. An information processing apparatus comprising:

a judging section configured to judge whether a receiving device for receiving a signal amplified by an amplifying circuit which amplifies a supplied signal has a good reception state or not; and a control device configured to change a power supply voltage of said amplifying circuit to change a gain of the amplifying circuit if said judging section judges that said receiving device does not have a good reception state; and further wherein the judging section makes it determination based on an error rate for a digital signal that is generated from the received signal wherein the power supply voltage is altered both up an down incrementally by the control device so that the amplifying circuit gain is adjusted across a range of values in order to prevent a saturation condition for the amplifying circuit.

\* \* \* \* \*